July 26, 1960  F. B. DUDLEY ET AL  2,946,661
PENTAFLUOROSULFUR HYPOFLUORITE AND METHOD FOR ITS PRODUCTION
Filed July 16, 1956
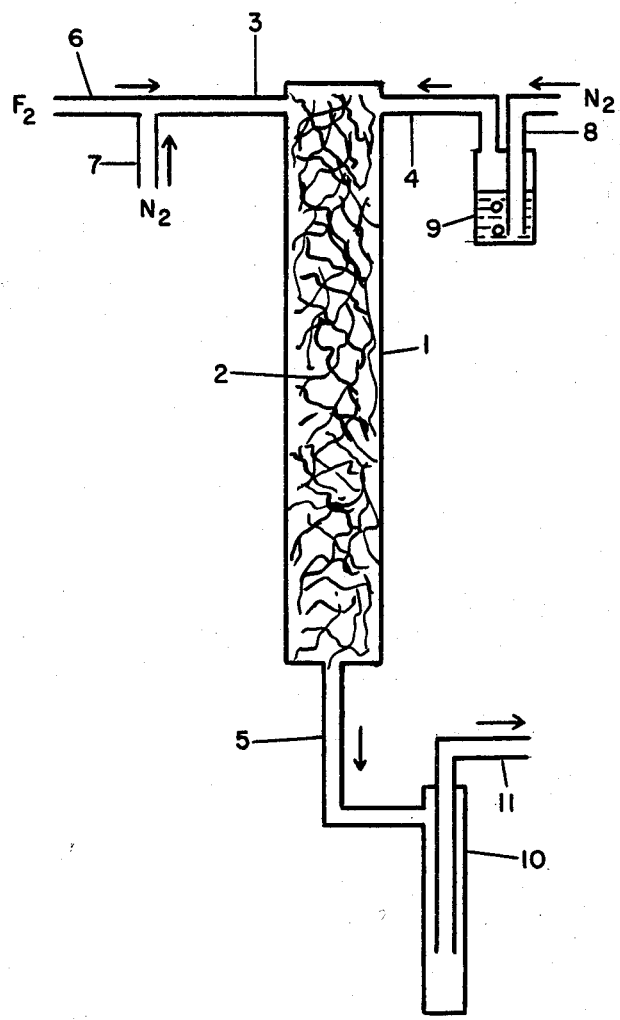
INVENTORS.
Francis B. Dudley
George H. Cady
BY George H. Cady

United States Patent Office 2,946,661
Patented July 26, 1960

2,946,661

PENTAFLUOROSULFUR HYPOFLUORITE AND METHOD FOR ITS PRODUCTION

Francis B. Dudley, 109 Mann St., Armidale, New South Wales, Australia, and George H. Cady, 2532 Royal Court, Seattle, Wash.

Filed July 16, 1956, Ser. No. 597,951

8 Claims. (Cl. 23—203)

This invention relates to the compound pentafluorosulfur hypofluorite ($SOF_6$). One object of the invention is to provide a novel compound containing as components fluorine, oxygen and sulfur, the compound being a powerful oxidizing agent which is stable at normal atmospheric temperatures. A second object of the invention is to provide an effective method of preparing said compound.

In the molecule of pentafluorosulfur hypofluorite one fluorine atom is bonded to oxygen and the other five fluorine atoms are bonded to sulfur, giving the structural formula $F_5SOF$. The presence of the O—F group makes this substance a hypofluorite. Like other hypofluorites, pentafluorosulfur hypofluorite is highly reactive. For example, it reacts with an aqueous solution of sodium hydroxide according to the equation,

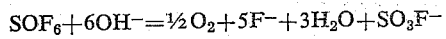

It also reacts with an aqueous solution of potassium iodide as follows:

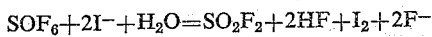

It reacts vigorously with hydrocarbons giving hydrogen fluoride as one product. These reactions establish the substance as a stronger oxidizing agent than oxygen and indicate its potential usefulness as an oxidant for fuels such as those used in rockets. The compound is stable at room temperature. It is a colorless gas which possesses an odor resembling that of oxygen difluoride and the other compounds classed as hydrofluorites. When inhaled in trace amounts it is highly irritating to the respiratory system. The observed vapor density is 162 grams per gram molecular volume (theoretical=162.06). Analysis has given the following values: sulfur, 19.8, 20.2%; fluorine, 71.1, 70.8% (theoretical, sulfur 19.8%; fluorine, 70.4%). The observed melting point is −86.0° C. and the density of the liquid at −24.3° C. is 2.011 grams per ml. The normal boiling point obtained by measuring the vapor pressure at various temperatures is −35.1° C.

As a class of substances, the hypofluorites are effective reagents for fluorination or oxidation reactions. They may also be used to introduce fluorine containing groups into molecules. It follows that pentafluorosulfur hypofluorite can be used for the fluorination of hydrocarbons and other compounds, and that it may be expected to add to certain other molecules, the $SF_5$ or $OSF_5$ group remaining intact. Reactions of this sort are known for trifluoromethyl hypofluorite which can, for example, add to perfluorocyclopentene ($C_5F_8$) to give the compound $CF_3OC_5F_9$. Pentafluorosulfur hypofluorite offers interesting and valuable possibilities as a reagent.

Most of the known hypofluorites suffer from the disadvantages of being unstable or too volatile to permit ease of storage in the liquid state. For example, the compounds $NO_3F$, $ClO_4F$, $CF_3COOF$ and $C_2F_5COOF$ may decompose explosively. The fluorides of oxygen, $O_2F_2$ and $OF_2$, are also unstable. The previously known stable hypofluorites are trifluoromethyl hypofluorite ($CF_3OF$) and fluorine fluorosulfonate ($SO_3F_2$). The former boils at −95.5° C. and the latter at −31.3° C. It follows that the two known hypofluorites which may be handled as liquids with the greatest safety and ease are pentafluorosulfur hypofluorite ($SOF_6$) and fluorine fluorosulfonate ($SO_3F_2$). Since the hypofluorites are effective as toxic gases or as oxidants for fuels such as those used in rockets, it follows that pentafluorosulfur hypofluorite is of particular value because of its ease and safety of handling.

Pentafluorosulfur hypofluorite may be produced by combining fluorine with thionyl fluoride at a temperature of about 200° C. To obtain $SOF_6$ one must cause more than one mole of fluorine to react with each mole of thionyl fluoride. It has been known in the past that fluorine and thionyl fluoride combine to form thionyl tetrafluoride as shown, $SOF_2+F_2=SOF_4$. To obtain a good yield of pentafluorosulfur hypofluorite it is desirable to use two or more moles of fluorine per mole of thionyl fluoride. The reason for this is to be seen in the equation $SOF_2+2F_2=SOF_6$. The effective temperature limits for obtaining pentafluorosulfur hypofluorite by this reaction are not known. It is known that 200° C. is satisfactory and that 25° C. is not. Probably the lower effective limit is somewhere between 100° C. and 200° C. Probably the upper temperature limit is that above which fluorine reacts rapidly with the metal of the apparatus. This may be near 400° C.

The drawing is a semi-diagrammatic view in sectional elevation of apparatus for carrying out the production of pentafluorosulfur hypofluorite. The reaction vessel 1 is made from copper tubing having an internal diameter of three inches and a length of three feet. It is packed with about ten pounds of copper ribbon 2 which was at one time plated with sliver, the total weight of silver being about one fourth pound. The ribbon has a thickness of 0.002 inch and a width of 0.018 inch. It is packed as a tangled mass leaving small pores for the easy flow of gases through the vessel. To the vessel are attached inlet tubes 3 and 4 and an outlet tube 5. The reaction vessel is insulated with asbestos paper and is heated by electricity flowing through coils of Nichrome ribbon wound over one layer of the asbestos paper. By controlling the flow of electricity, the vessel may be kept at any desired temperature within a range of about twenty centigrade degrees.

Before the reaction vessel was used, a stream of fluorine was passed until the silver in the copper ribbon had been changed to silver difluoride.

In one particular run a controlled stream of fluorine entered the system at 6 and was mixed with a stream of dry nitrogen flowing through tube 7 at a rate of about three liters per hour. The mixture entered the reactor through inlet tube 3. Dry nitrogen flowing at a rate of ten liters per hour entered tube 8 and bubbled through liquid thionyl fluoride ($SOF_2$) held in vessel 9 at a temperature close to −78° C. The resulting mixture of nitrogen and thionyl fluoride vapor entered the reaction vessel through inlet tube 4. Nitrogen and gaseous products flowed from the reactor through outlet tube 5 and trap 10. The trap was cooled externally by a bath of liquid oxygen. The various reaction products condensed in the trap while nitrogen and unreacted fluorine passed from the trap through tube 11. The presence of fluorine in the exit gas could be detected by the odor of the gas and by its behavior toward paper moistened with a solution of potassium iodide. The presence of fluorine caused the paper to turn yellow or brown (due to free iodine) when held in the stream of gas flowing from tube 11. When fluorine was absent, no color change took place. In this particular run the rate of flow of fluorine from its cylinder was controlled to permit a small proportion of it to escape through tube 11. The reactor was held within the temperature range 190° C. to 210° C. From a 63 gram sample of thionyl fluoride, products weighing 74 g. condensed in trap 10. This crude product was fractionally distilled and was found to contain sulfuryl fluoride (probably from accidental hydrolysis of another product) thionyl tetrafluoride ($SOF_4$) and pentafluorosulfur hypofluorite. The latter constituted about 50% of the original crude product.

Although pentafluorosulfur hypofluorite has been produced only in the reaction vessel described above, it is certain that the shape and size of the vessel may be varied, and it is probable that the copper ribbon coated with silver difluoride is not required. Surely inert diluents other than nitrogen may be used successfully. It may even be that diluents are unnecessary.

Pentafluorosulfur hypofluorite may also be produced by the reaction of fluorine with sulfur dioxide. The same apparatus as that described above is satisfactory. In one run liquid sulfur dioxide was placed in vessel 9. No thionyl fluoride was present. The operating conditions were like those described above. Nitrogen was used as a diluent; the temperature of the reactor was approximately 200° C.; fluorine was used in such an amount that some of it passed through the system without reacting. In this run the condensed product melted to give about 15 ml. of liquid. Of this approximately 1 ml. was found to be pentafluorosulfur hypofluorite.

The word "hypofluorite" as applied to substances mentioned above and in the claims which follow is employed because a molecule of such a substance contains an O—F group in which a fluorine atom is directly linked to an oxygen atom in the molecule. The O—F group is called an "hypofluorite group" or "hypofluorite radical."

Although only specific examples of the invention have been described, it will be apparent to those skilled in the art that numerous modifications may be made therein without departure from the spirit of the invention or the scope of the appended claims.

We claim:

1. As a new chemical compound, pentafluorosulfur hypofluorite ($SOF_6$).

2. A process of producing pentafluorosulfur hypofluorite which comprises contacting gaseous thionyl fluoride with fluorine, within the temperature range 100° C. to 400° C., in the presence of a porous mass of copper coated with silver fluoride, the amount of fluorine as measured in moles being greater than the amount of thionyl fluoride.

3. A process as defined in claim 2 in which an inert gas is added to the reactants.

4. A process of producing pentafluorosulfur hypofluorite which comprises contacting gaseous thionyl fluoride with fluorine, within the temperature range 190° C. to 210° C., in the presence of a porous mass of copper coated with silver fluoride, the reactants being used in a ratio of at least two moles of fluorine per mole of thionyl fluoride.

5. A process as defined in claim 4 in which an inert gas is added as a diluent.

6. A process as defined in claim 5 in which pentafluorosulfur hypofluorite is separated from the crude reaction product by fractional distillation.

7. A process in which streams of fluorine and gaseous thionyl fluoride, each diluted by an inert gas, the reactants being used in a ratio of at least two moles of fluorine per mole of thionyl fluoride, are brought together in a reaction vessel containing a mass of porous copper coated with silver fluoride at a temperature within the range 190° C. to 210° C., and the reaction product is condensed to give a crude material from which pentafluorosulfur hypofluorite is obtained by fractional distillation.

8. A process as defined in claim 7 in which the total rate of flow of gas as measured in liters per hour is not more than twenty times as great as the volume in liters of the reaction vessel.

References Cited in the file of this patent

UNITED STATES PATENTS

| | | |
|---|---|---|
| 2,562,432 | Gilman | July 31, 1951 |
| 2,772,144 | Belf | Nov. 27, 1956 |